US011861277B1

(12) United States Patent
Singh

(10) Patent No.: US 11,861,277 B1
(45) Date of Patent: Jan. 2, 2024

(54) SYSTEM AND METHOD FOR ROUTING IN AN ELECTRONIC DESIGN

(71) Applicant: Cadence Design Systems, Inc., San Jose, CA (US)

(72) Inventor: Pratul Kumar Singh, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/477,101

(22) Filed: Sep. 16, 2021

(51) Int. Cl.
*G06F 30/327* (2020.01)
*G06F 30/347* (2020.01)
*G06F 115/10* (2020.01)

(52) U.S. Cl.
CPC .......... *G06F 30/327* (2020.01); *G06F 30/347* (2020.01); *G06F 2115/10* (2020.01)

(58) Field of Classification Search
CPC .................................................. G06F 30/327
USPC ........................................................ 716/101
See application file for complete search history.

(56) References Cited

U.S. PATENT DOCUMENTS

| 8,463,881 B1* | 6/2013 | Baker ............... H04L 9/40 709/229 |
| 8,680,886 B1* | 3/2014 | Atsatt ........... H03K 19/017581 326/38 |
| 11,100,028 B1* | 8/2021 | Subramaniam ..... G06F 13/4221 |
| 2013/0039207 A1* | 2/2013 | Vadasz ............... H04L 49/1584 370/252 |
| 2018/0011959 A1* | 1/2018 | Irissou ................. G06F 30/30 |
| 2019/0079578 A1* | 3/2019 | Ehmann .................. G06F 1/28 |
| 2019/0089582 A1* | 3/2019 | Bernardi ............ H04L 41/0803 |
| 2019/0179778 A1* | 6/2019 | Reents .................. G06F 13/38 |
| 2021/0288910 A1* | 9/2021 | Daly ..................... H04L 47/22 |

* cited by examiner

*Primary Examiner* — Suchin Parihar
(74) *Attorney, Agent, or Firm* — Mark H. Whittenberger, Esq.; Holland & Knight LLP

(57) ABSTRACT

Embodiments include herein are directed towards a method for electronic circuit design. Embodiments may include enabling data transmission between plurality of protocol adapters, each of the protocol adapters including one ingress port and one egress port, wherein the ingress port of each of the plurality of protocol adapters maintains an active connection with a single egress port at one time. Embodiments may further include transmitting data between the plurality of protocol adapters using a distributed routing matrix that provides an interface between the plurality of protocol adapters.

18 Claims, 11 Drawing Sheets enabling data transmission between plurality of protocol adapters, each of the protocol adapters including one ingress port and one egress port, wherein the ingress port of each of the plurality of protocol adapters maintains an active connection with a single egress port at one time

202 transmitting data between the plurality of protocol adapters using a distributed routing matrix that provides an interface between the plurality of protocol adapters

204

10

enabling data transmission between plurality of protocol adapters, each of the protocol adapters including one ingress port and one egress port, wherein the ingress port of each of the plurality of protocol adapters maintains an active connection with a single egress port at one time

202

transmitting data between the plurality of protocol adapters using a distributed routing matrix that provides an interface between the plurality of protocol adapters

SYSTEM AND METHOD FOR ROUTING IN AN ELECTRONIC DESIGN

FIELD OF THE INVENTION

The present disclosure relates to a method of electronic circuit design, and more particularly, to a high availability routing matrix architecture and protocol.

BACKGROUND

As integrated circuit design grows more complicated, it is necessary to verify and validate designs with many components talking to each other. This means that the hardware and software verification tools need to connect multiple design entities talking simultaneously using a common exchange unit (transaction). At present in most solutions which require routing, the data is transferred to software, or to an embedded central processing unit ("CPU"), where the routing is done. This works sufficiently when the design throughput is low, or when the embedded CPU can run at a much higher clock frequency, to bridge over the speed differential.

SUMMARY

In one or more embodiments of the present disclosure, a computer-implemented method for electronic circuit design is provided. The method may include enabling data transmission between plurality of protocol adapters, each of the protocol adapters including one ingress port and one egress port, wherein the ingress port of each of the plurality of protocol adapters maintains an active connection with a single egress port at one time. Embodiments may further include transmitting data between the plurality of protocol adapters using a distributed routing matrix that provides an interface between the plurality of protocol adapters.

One or more of the following features may be included. In some embodiments, the routing matrix may be entirely implemented using a register-transfer-level implementation. The routing matrix may utilize a four phase packet exchange protocol with pipelining. The protocol may allow for simultaneous parallel request and packet transmission. The routing matrix may include buffering for packet requests. The routing matrix may include direct and stable zero clock delay. The routing matrix may not include a dedicated central processing unit. The protocol may allow at least a first active connection to perform other operations if a first path is busy. A target may decide a priority of an incoming path and requests a packet from an initiator. The routing matrix may include a plurality of decentralized memories.

In one or more embodiments of the present disclosure a computer-readable storage medium having stored thereon instructions, which when executed by a processor result in one or more operations is provided. Operations may include enabling data transmission between a plurality of protocol adapters, each of the protocol adapters including one ingress port and one egress port, wherein the ingress port of each of the plurality of protocol adapters maintains an active connection with a single egress port at one time. Each ingress port may be configured to receive one or more transport layer packets from one or more of the plurality of protocol adapters. The one or more transport layer packets may be stored in at least one local buffer. Operations may further include transmitting data between the plurality of protocol adapters using a distributed routing matrix that provides an interface between the plurality of protocol adapters, wherein the distributed routing matrix includes a routing table that stores one or more paths and path properties.

One or more of the following features may be included. In some embodiments, the routing matrix may be entirely implemented using a register-transfer-level implementation. The routing matrix utilizes a four phase packet exchange protocol with pipelining among a request and packet exchange phase. The protocol may allow for simultaneous parallel request and packet transmission. The routing matrix may include buffering for packet requests. The routing matrix may include direct and stable zero clock delay. The routing matrix may not include a dedicated central processing unit. The protocol may allow at least a first active connection to perform other operations if a first path is busy. A target may decide a priority of an incoming path and requests a packet from an initiator. The routing matrix may include a plurality of decentralized memories.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is an exemplary flowchart of a routing process according to an embodiment of the present disclosure;

DETAILED DESCRIPTION

Figure 1:
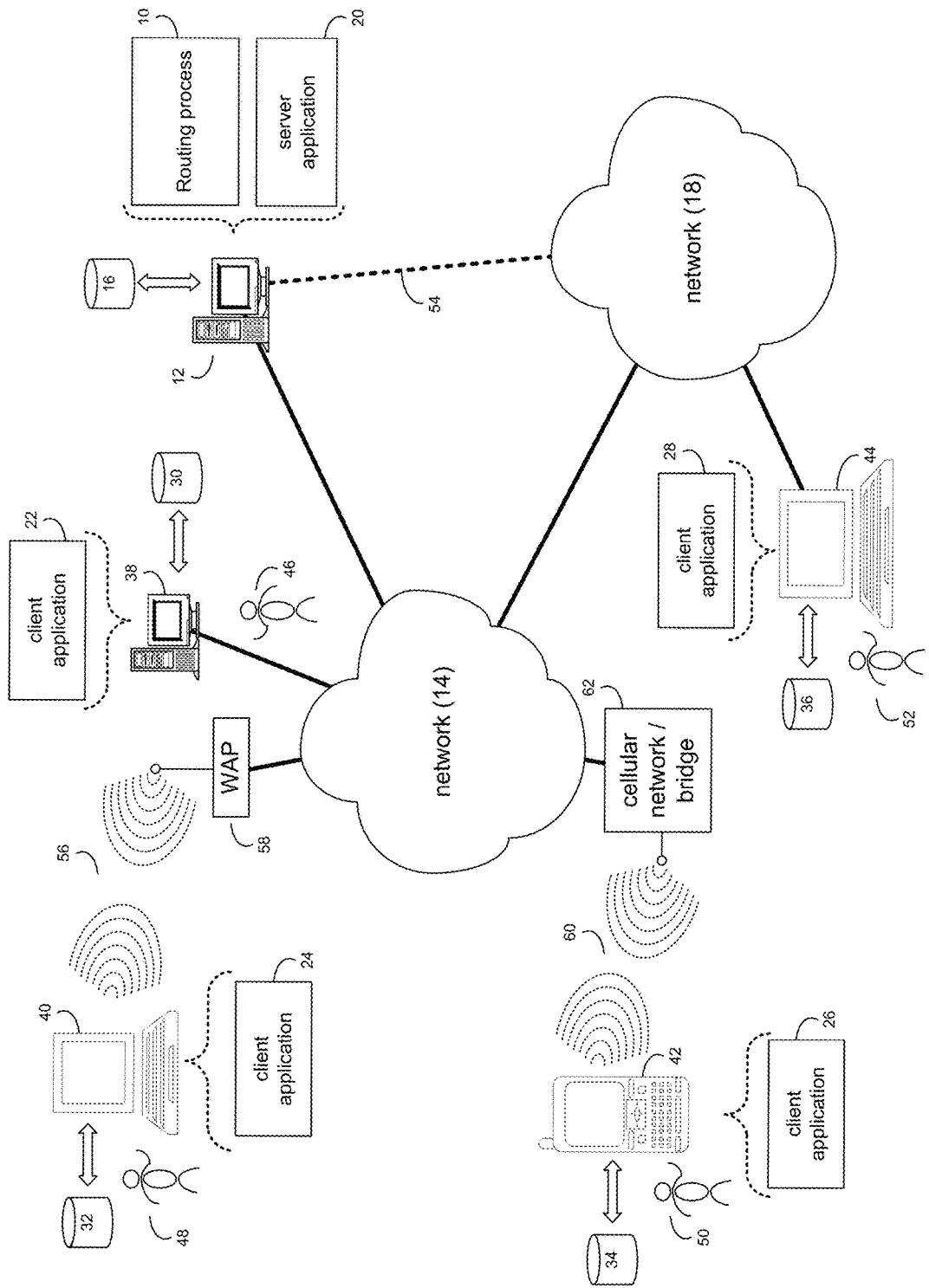
FIG. 1 diagrammatically depicts a routing process coupled to a distributed computing network.

As discussed above, hardware and software verification tools may need to connect multiple design entities talking simultaneously using a common exchange unit (transaction). Accordingly, embodiments of the present disclosure are directed towards a routing process that defines the common architecture for the routing logic which transfers the transactions between a sender (initiator/ingress) and a receiver (target/egress). Embodiments included herein describe the protocol of transaction exchange and its improvement upon existing technologies, and ensure that both the initiator and target are free to perform other tasks while they are waiting for the other end. In this way, multiple entities may communicate with each other simultaneously and with minimal latency between transfers.

As Design Under Tests ("DUT"s) become more and more complicated, the verification scenarios warrant more complex verification components. A verification component may include a hardware and/or software entity which is not part of the design, but is a component used to test and verify functionality the design features and functionality. Occasionally, a single verification component is not enough and the design requires many of these verification components to communicate with each other, which requires internal routing between multiple instances. Accordingly, embodiments of the routing process included herein define an architecture and a protocol to implement a routing matrix to allow multiple verification components to communicate with each other with very high throughput. The proposed routing matrix utilizes multiple de-centralized memories to make the design easier to partition and has very high availability. For example if there exists a path from entity A to B, and there is another from entity C to D, then they operate completely independently and unhindered, thus no arbitration may be required. If there are multiple paths amongst entities P to Q and P to R then the bandwidth is shared, but the connection is never blocked and the paths may still operate independently, activating for transfer only when there is an available packet to be sent over. The priority and arbitration logic are completely configurable and the proposed protocol allows for architectures allowing both the sending and receiving entities to prioritize as is discussed in further detail hereinbelow.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Referring to FIG. 1, there is shown a routing process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, routing process 10 may reside on a client electronic device, such as a personal computer, notebook computer, personal digital assistant, or the like.

The instruction sets and subroutines of routing process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute routing process 10. Examples of client applications 22, 24, 26, 28 may include, but are not limited to, design verification tools such as those available from the assignee of the present disclosure. These applications may also be executed by server computer 12. In some embodiments, routing process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the routing process may be a client-side application (not shown) residing on one or more client electronic devices 38, 40, 42, 44 (e.g., stored on storage devices 30, 32, 34, 36, respectively). As such, the routing process may be a stand-alone application that interfaces with a client application (e.g., client applications 22, 24, 26, 28), or may be an applet/application that is executed within a client application. As such, the routing process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, routing process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Referring now to FIG. 2, a flowchart depicting an embodiment consistent with routing process 10 is provided. Embodiments may include enabling 202 data transmission between plurality of protocol adapters, each of the protocol adapters including one ingress port and one egress port, wherein the ingress port of each of the plurality of protocol adapters maintains an active connection with a single egress port at one time. Embodiments may further include transmitting 204 data between the plurality of protocol adapters using a distributed routing matrix that provides an interface between the plurality of protocol adapters. Numerous other operations are also within the scope of the present disclosure.

Figure 3:
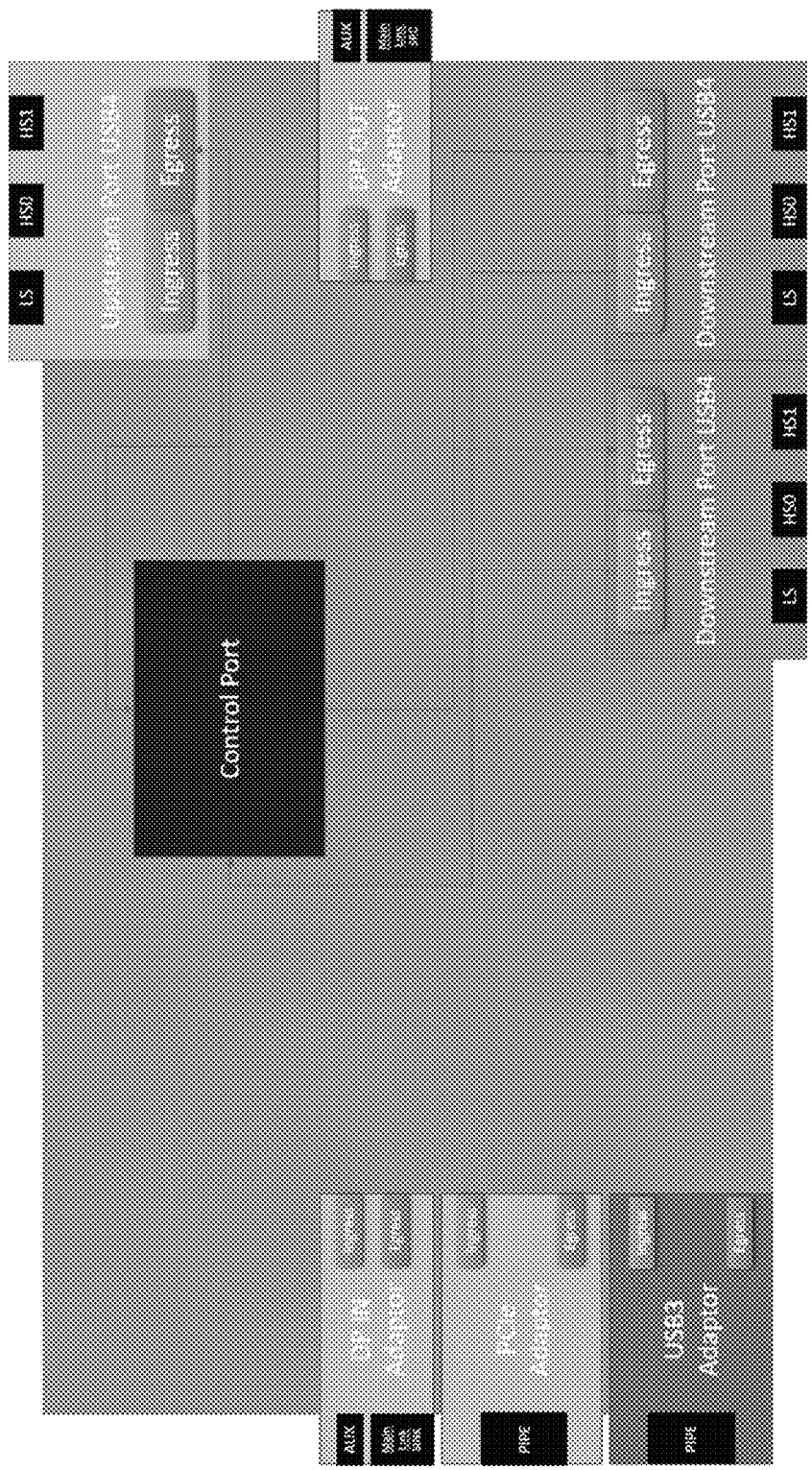
FIG. 3 is an example USB4 router architecture according to an embodiment of the present disclosure.

Referring now to FIG. 3, a diagram 300 showing an example USB4 router architecture is provided. While examples included herein discuss USB4 it should be noted that this is provided merely by way of example as embodiments of routing process 10 may be used in a variety of different applications. Modern communication interfaces like USB4 are more than a collection of simple one-to-one connections. These devices act more like network routers. When a customer wishes to test their own USB4 host or device on an emulation platform (such as those available from the Assignee of the present disclosure), they would need the corresponding pair device or host component to push traffic on to their DUT. Some verification components may be employed with the primary goal of pushing as much data as allowed on to the DUT running on the emulation platforms from the software side, and simultaneously grabbing as much data as possible from the DUT and providing the user with an application programming interface ("API") to drive/receive this traffic on the simulator side.

The DUT running on emulation platforms, typically would operate on the fastest design clock frequency it was compiled to, but with these verification components trying to interact with the software layers, the design clock has to stop to allow the software to catch up with the emulation platforms. The less frequent these interruptions happen, the faster the DUT can operate leading to lower verification turnaround.

Specifically, for USB4, the protocol may tunnel various other protocols some of which may include, but are not limited to, DisplayPort, PCIe, and USB3, over the USB4 fabric. A single USB4 device may have multiple instances of these tunnelled protocol instances (called adapters/ports) connected to one USB4 adapter port. In some cases, there may be more than one USB4 Adapter in a device, for a hub like configuration, with one adapter acting as an upstream port, and the other downstream. The main controller of this hierarchy is referred to as a configuration manager (CM), which is at the top of the hierarchy operating inside a USB4 host.

To help achieve this, the USB4 protocol may include a transport layer, in which all the adapters may talk to each other via packets referred to as transport layer packets (TLP), and there may be up to 64 adapters in one device. Every adapter may include two entities, one referred to herein as an "ingress", which may buffer in all the TLPs coming in the transport layer, and another referred to herein as an "egress" which prioritizes all the packets going out of the transport layer. The USB4 protocol may also define the way routes/logical connection between adapters may be established from the CM by programming register sets within a routing table but is silent on the actual mechanism of the TLP exchange between the adapters, and how the adapters actual transfer packets among each other.

Accordingly, embodiments of routing process 10 provide an architecture and protocol to exchange the TLPs. This approach outlines the specific constraints being used within an emulation platform, the maximum protocol throughput allowed for the DUT, and allows for many verification scenarios to mimic and validate real life designs.

Figure 4:
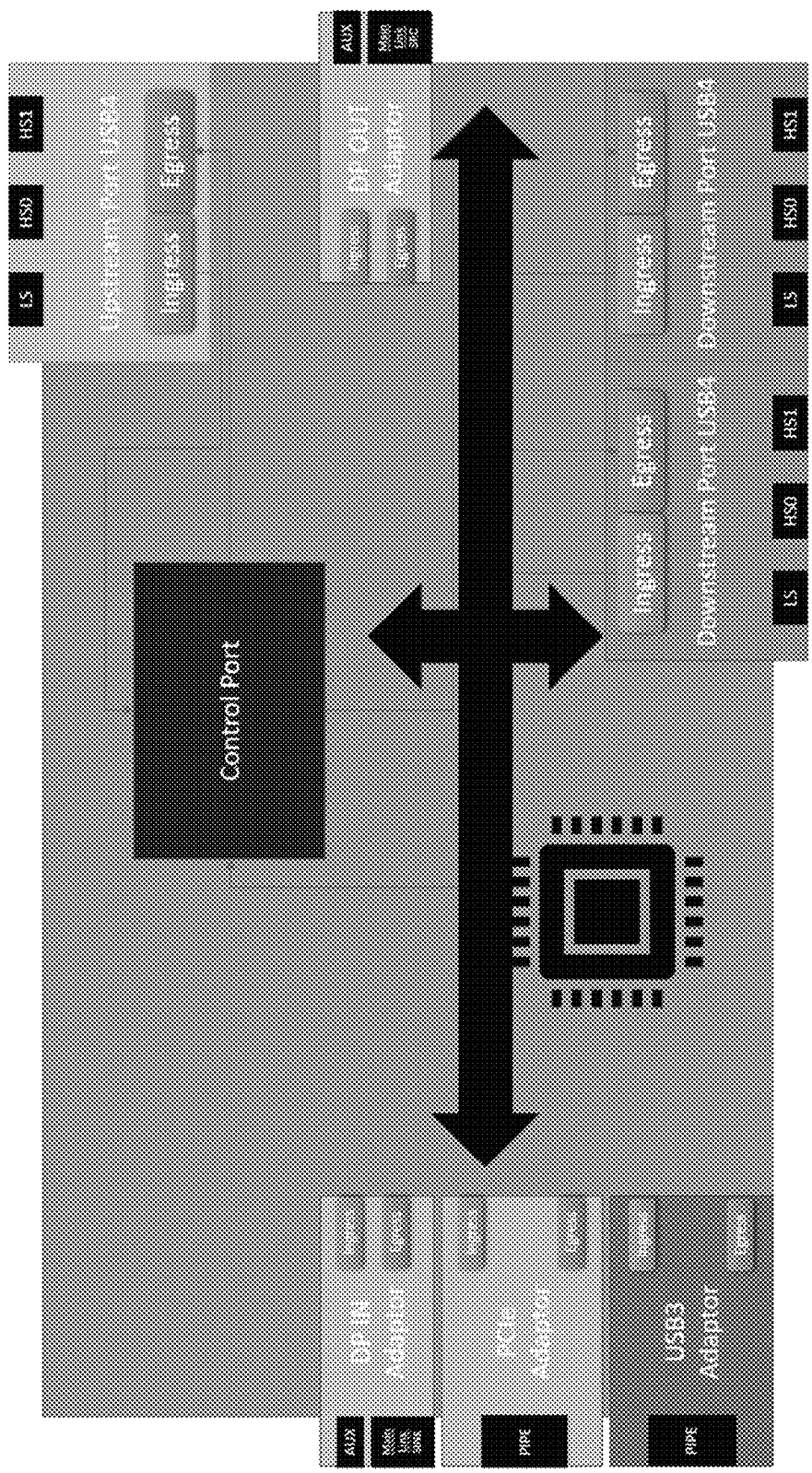
FIG. 4 is an example showing a diagram with a dedicated central processing unit ("CPU") according to an embodiment of the present disclosure.

Using existing approaches, the routing logic is typically implemented in an emulation setting using some of the approaches discussed below. As shown in FIG. 4, one approach includes using a dedicated CPU, which generally involves employing a dedicated CPU running at a very high frequency design clock. This approach has the advantage of being 100% RTL, so no hardware/software exchanges need to happen, the CPU may be programmed using firmware to adjust to different user scenarios, and the byte code may be loaded into the memory after compilation. However, this scenario is disadvantageous in terms of the actual gate area, and the CPU design clock needed would be more than the fastest USB4 clock frequency. This would slow down the entire verification environment, leading to a significantly overall lower throughput. Also, a single CPU would struggle to keep up with 64 requests coming in from all of the active ports simultaneously, which would require more than one CPU, further multiplying the disadvantages.

Figure 5:
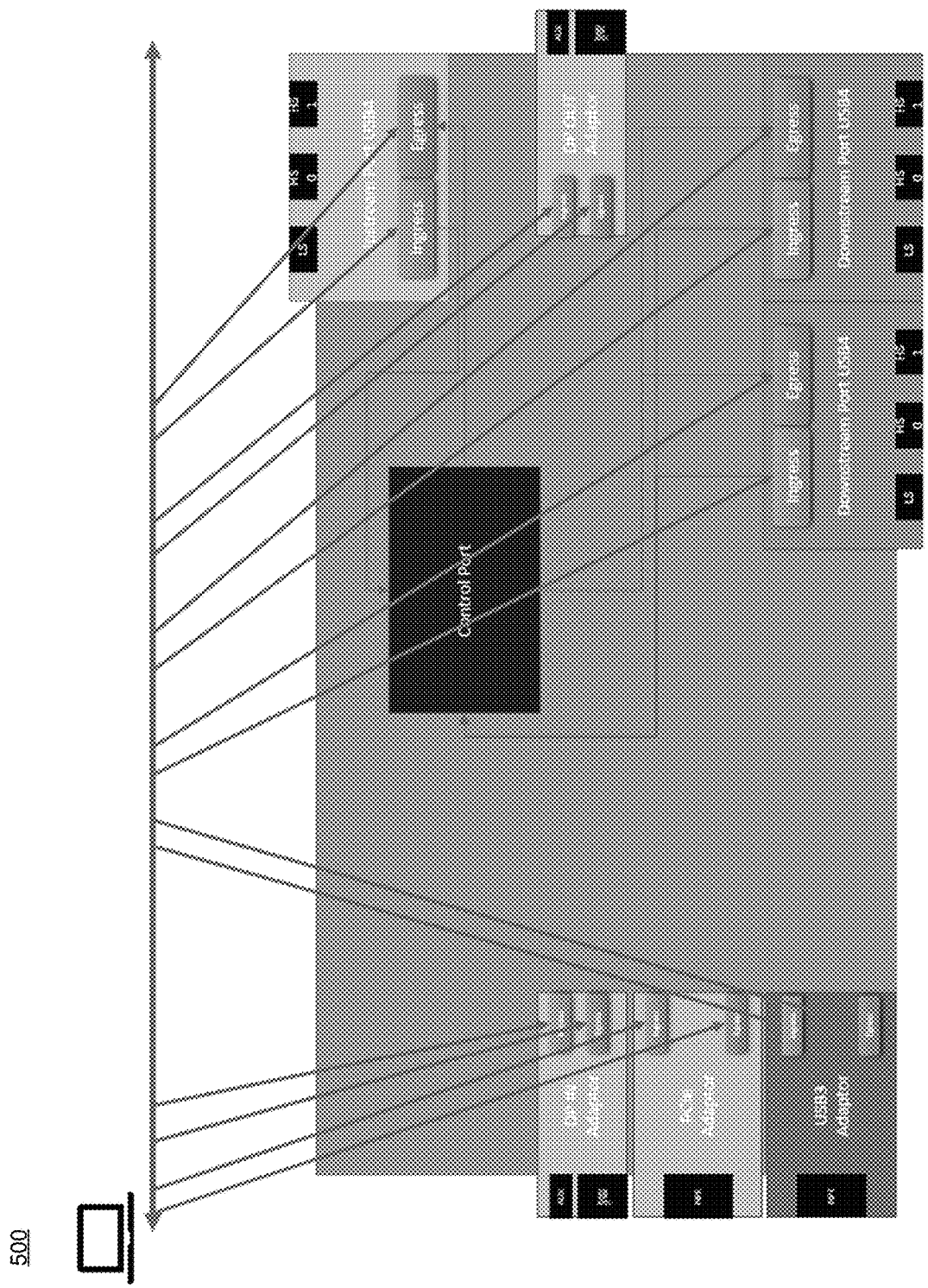
FIG. 5 is an example showing routing using simulation acceleration according to an embodiment of the present disclosure.

Referring now to FIG. 5, an embodiment showing a diagram 500 depicting another approach that involves delegating the routing logic to the software layer is provided. Since we are talking in terms of hardware/software co-design, there is a possibility to pass all the TLPs to the software layer running on the host parallel to the DUT and verification components running on the emulator. This approach has the advantage of being least costly in terms of gate area, and there is no need to use a faster clock than the USB4 design clock. However, every time the hardware/software buffers are empty, the hardware will have to stop and wait for the software to catch up. This may have an impact on the overall design throughput. Also, since there are multiple verification components for DisplayPort, PCIe and USB3 protocols, with their respective software layers running in parallel, the host connected to the emulator would get loaded very quickly making this a solution that is difficult to scale.

Figure 6:
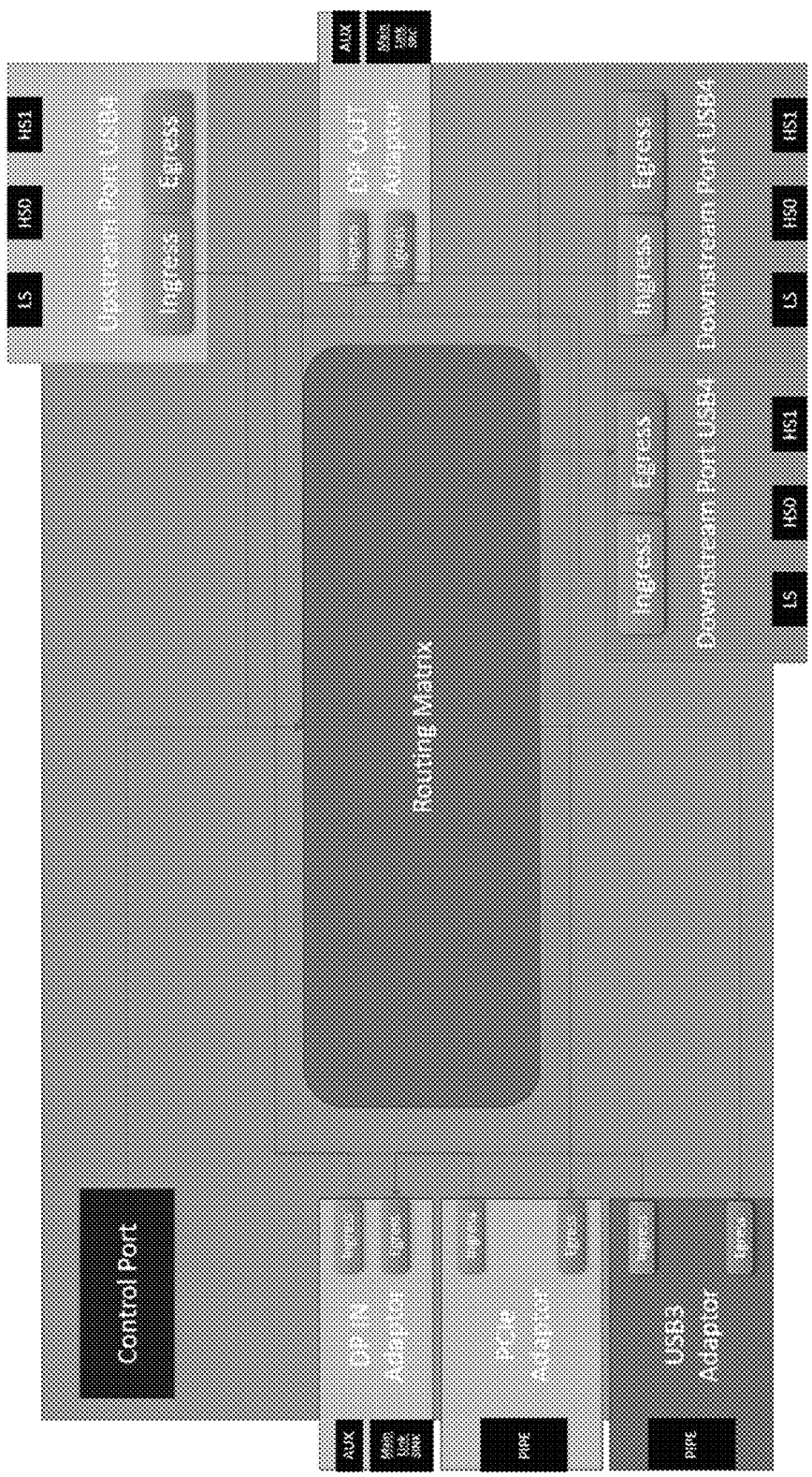
FIG. 6 is an example showing a register transfer level ("RTL") solution according to an embodiment of the present disclosure.

Referring now to FIG. 6, and in contrast to the approaches described above, embodiments of routing process 10 include a 100% RTL implementation 600, including a custom protocol for TLP exchange. Since the complete protocol is RTL-based, there are no hardware/software exchanges required to properly route the packets, and the protocol may operate at the fastest USB4 clock frequency thus mitigating clock related slowdown. This implementation is completely non-blocking in nature, and may be distributed amongst the various adapters, so there is no single controlling logic. All adapters may be treated at par, and this architecture allows for simultaneous transfers between all the adapters. This protocol is more scalable and should allow for far more than 64 entities to communicate. Also, the egress and ingress adapters are unblocked to attempt sending/receiving TLPs with other adapters if the adapter they are trying to transact with are busy. Also, this approach is better from compilation perspective, and leads to a lower step count (critical path).

In some embodiments, routing process 10 may include a routing architecture and associated protocol as are discussed in further detail below. For the transport layer, the design may be split up into two major parts. The first is the individual protocol adapters, with one ingress and one egress each. The second part is a single module referred to herein as the "routing matrix", which may be configured to interface with all the adapters.

In some embodiments, the architecture may be configured such that the ingress ports may receive the TLPs from the various adapters and store them in local buffers (as per the USB4 protocol in this example). The logical connections, referred to herein as "paths", may be configured by the CM, and these values may be saved in the routing table. The routing table may include one bit to indicate that the path is active and one unique identifier referred to herein as "HopID". The routing table may include one or more static parameters for a path such as the output adapter number which once set may remain fixed for the complete duration of the path's existence. The routing table may include one or more dynamic parameters that may change on the basis of the present workload. Since there may be a finite number of unique identifiers, the HopIDs may be reused between different paths. To enable this the unique identifier HopID may be changed by the ingress port and this value may be stored within the routing table. In some embodiments, the routing table may be stored within the ingress, and this may include one or more of the following parameters:

1. Valid: One-bit value to indicate if the path is valid.
2. HopID: This is a logical name for the Path.
3. Output HopID: The Output HopID for the outgoing packet.
4. Output Adapter Number: This value is the destination adapter number, to which the TLPs on this path are supposed to be sent to.
5. Priority: This value is the priority of the path. This value can help decide the path priority at the egress port of the destination egress port.
6. Weight: This value helps avoid a high priority path hogging all bandwidth. The Egress can only schedule TLPs equal to the weight count in one round, after that paths with lower priority are selected.

In this example, the HopID is the unique identifier, output adapter number and priority are static parameters while weight is a dynamic parameter which may be changed even after the path has been activated.

In some embodiments, the actual routing protocol may be split up into multiple distinct phases. Some of these may include, but are not limited to, Request, RequestAck, PktTransferRequest, and PktTransfer. Each of these is discussed in further detail hereinbelow.

In some embodiments, the routing matrix and the ingress ports may be connected using the following prominent RTL signals for the Request and RequestAck phases (the same signals may also connect the routing matrix and egress port, but all directions are reversed):

TABLE 1

List of Signals for Request Phase

| Signal Name | Direction I (Ingress -> Routing-Matrix; Routing-Matrix -> Egress) O (Routing-Matrix -> Ingress; Egress -> Routing-Matrix) | Type | Description |
| --- | --- | --- | --- |
| r.Request | I | Enum | Request Type from Ingress to Egress |
| r.HopID | I | Unsigned | Unique Identifier for the Path |
| r.Count | I | Unsigned | Number of Packets for the Request |
| r.OutputPort | I | Unsigned | Destination Port |
| r.InputPort | I | Unsigned | Originating Port |
| r.Parameters [Priority, Weight] | I | Unsigned | Path Parameters |
| r.Ack | O | Bool | Acknowledgement |
| r.Nack | O | Bool | Not-Acknowledge |

The Request Enum may include multiple values, for example for USB4, we use PathSetupRequest, Path.

For the PktTransferReq and PktTransfer phase, an example of a signal list is provided below:

TABLE 2

List of Signals for Packet Transfer Phase

| Signal Name | Direction I (Egress -> Routing-Matrix; Routing-Matrix -> Ingress) O (Routing-Matrix -> Egress; Ingress -> Routing-Matrix) | Type | Description |
|---|---|---|---|
| p.Request | I | Enum | Request Type from Ingress to Egress |
| p.HopID | I | Unsigned | Unique Identifier for the Path |
| p.OutputPort | I | Unsigned | Destination Port |
| p.InputPort | I | Unsigned | Originating Port |
| p.Packet | O | Packet Structure | The Actual Transaction |
| p.PacketValid | O | Bool | If the Packet is Valid |
| p.Ack | I | Bool | Acknowledgement from Egress |
| p.Nack | I | Bool | Not-Acknowledgement from Egress |
| p.Done | O | Bool | Terminating signal from Ingress |

Figure 7:
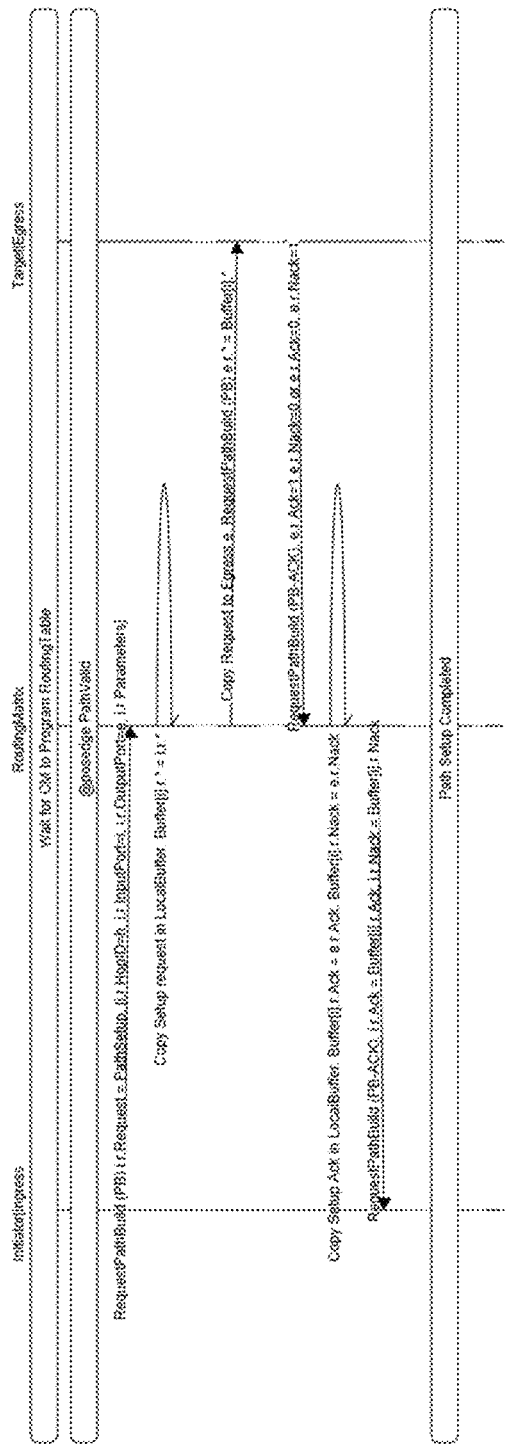
FIG. 7 is an example showing a path setup sequence chart according to an embodiment of the present disclosure.
Figure 8:
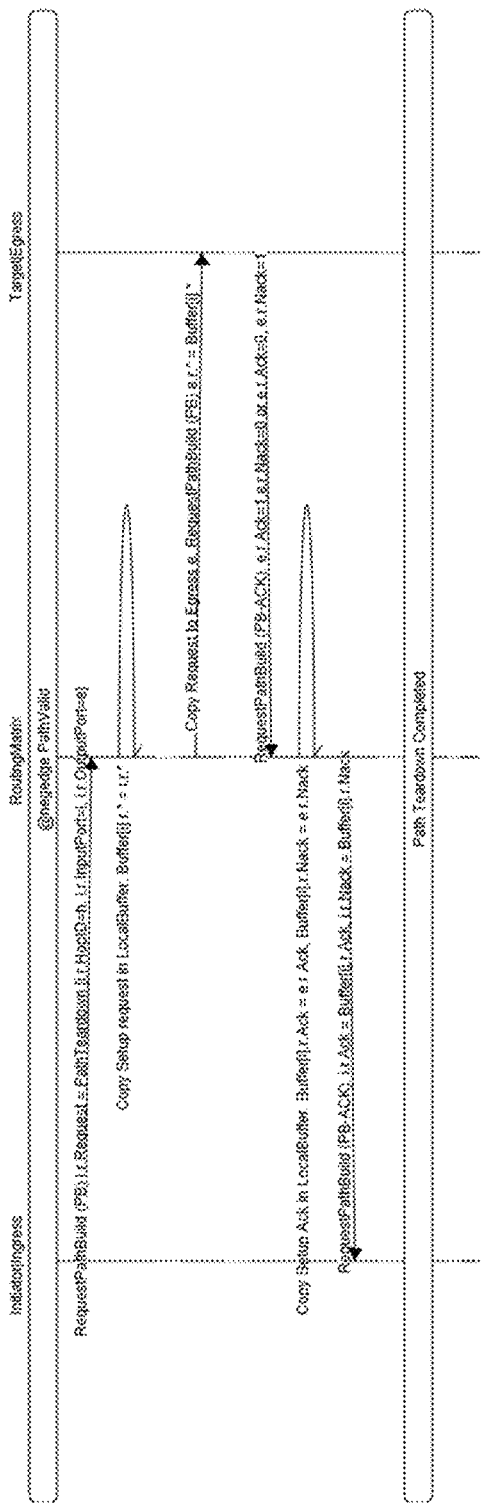
FIG. 8 is an example showing a path teardown sequence chart according to an embodiment of the present disclosure.

In some embodiments, and referring also to FIGS. 7-8, routing process 10 may include a path setup and a path teardown protocol each of which is discussed in further detail hereinbelow. Path setup and teardown processes may only employ the Request and RequestAck phases. Both may follow the same process as listed below.

In the Request phase, the ingress port may monitor the routing table, and any HopID going from Valid=0 to Valid=1, triggers a path setup request, while a transition from Valid=1 to Valid=0 triggers a PathTearDown request. There may be multiple path setup/teardown requests active at one point of time, the ingress adapter monitors all open requests, and analyzes them one by one.

In some embodiments, for every request, the routing matrix may be informed of the request by changing the i.r.Request from NOP [No Operation] to [PathSetup or PathTearDown] as applicable, with i.r.HopID, i.r.InputPort, i.r.OutputPort, set to valid values. For a PathTeardown request, i.r.Parameters may be unset, but it requires valid values for a PathSetup request.

In some embodiments, the routing matrix may analyze all the active ports, and check the values of the request phase signals facing the ingress ports. For any port, if there is no pending request, the values may be stored in the internal buffers. The ingress adapter may continue to wait until i.r.Ack is set.

In some embodiments, the routing matrix also goes through all its internal buffers and evaluates if there are any pending requests. For all pending requests, it checks if there are no requests destined to the same egress port, if so, it performs an internal priority resolution, and selects the one with more priority, or least port number. Then, it may pass on the value of the i.r.Request, i.r.HopID, i.r. InputPort, i.r.OutputPort and i.r.Parameters to the destined egress port.

In some embodiments, routing process 10 may also include a request acknowledgement phase [RequestAck]. Here, all egress ports may evaluate the requests they receive from the routing matrix and revert back with e.r.Ack=1 or e.r.Nack=1, or they continue to hold on to the request for a pre-defined timer value. If this is saved in the internal buffers of the routing matrix, and at the next clock edge, this response (e.r.Ack and e.r.Nack) may be sent back to the waiting ingress adapter. If the routing matrix does not see any response after the specified timer elapses, the request may be cancelled, all the signals r.* facing the egress ports may be set to 0, and the e.r.Nack=1 may be sent to the ingress port, which then either reattempts the same request again, or attempts a different request.

Figure 9:
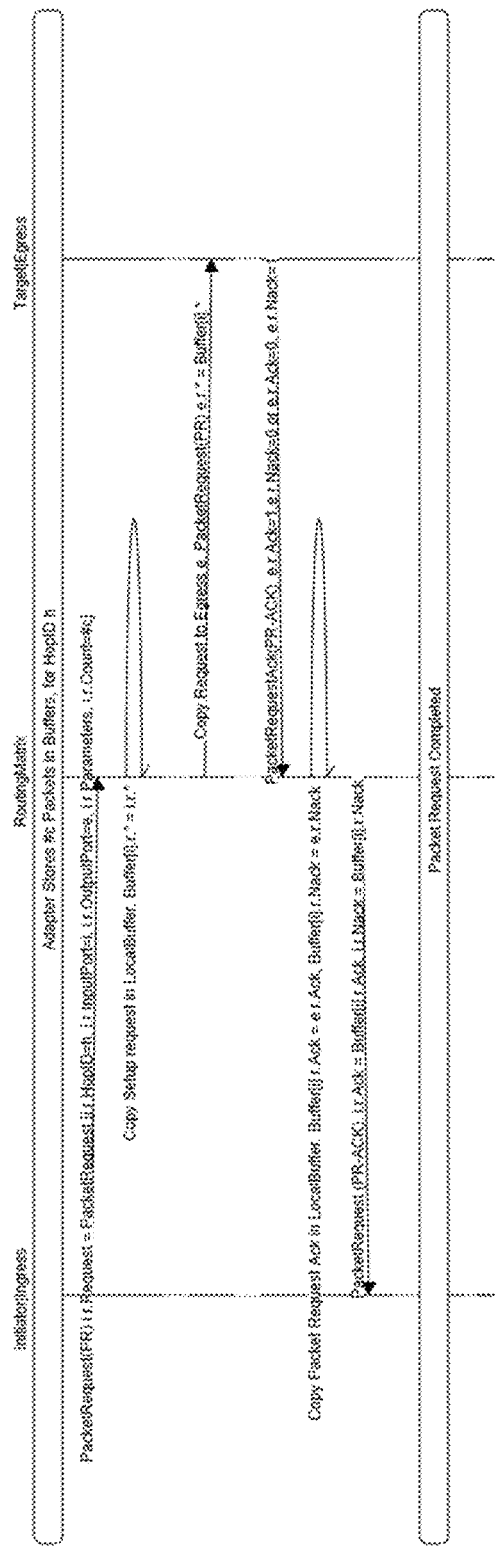
FIG. 9 is an example showing a packet transfer request sequence chart according to an embodiment of the present disclosure.

In some embodiments, and referring also to FIG. 9, routing process 10 may include a protocol for TLP exchange. The protocol to exchange TLPs between different instances may include a multi-part approach. The first part may include a packet request phase (e.g., Packet Request [Request] shown in FIG. 9). Here, the TLPs may be stored in the ingress port "i" against multiple HopIDs. When the ingress adapter is free, the buffers may be scanned and on all the paths which have active packets in wait. The ingress adapter may internally prioritize the open paths, for example, for most adapters the paths to the USB4 adapter should have a higher priority. This request may then be scheduled on to the routing matrix. i.r.Request may be changed to PacketRequest, i.r.InputPort=i, i.r.OutputPort=e, i.r.Count=C are set to valid values, and the i.r.Parameters are set to dynamic parameter values pulled out from the routing table. The routing matrix may then analyze all the active ports, checking if the particular adapter has an active request. If not, the routing matrix may copy over the values in the local buffer.

In some embodiments, the protocol for TLP exchange may include a packet request acknowledgement [RequestAck] phase. Here, the routing matrix may analyze all the pending requests for egress adapters and once it identifies a pending request in the local buffer, it copies these values over to the destined egress adapter. The egress adapter may acknowledge the request with e.r.Ack=1, or discard if it is either not ready, or there is no valid path by setting e.r.Nack=1. These values may be stored in the local buffers present in the routing matrix. Then, the routing matrix may push back the result of the request from its local buffer back to the ingress adapter. The ingress adapter may read the values of the i.r.Ack and i.r.Nack. If the request is acknowledged, then the ingress adapter waits for a request from the egress adapter, otherwise it is free to request again or inform the higher layers of the failure.

In some embodiments, the protocol for TLP exchange may include packet transfer request [PktTransferRequest] phase. Here, the egress adapter is aware of the number of packets pending, the HopIDs, the static and dynamic path parameters, and the egress adapter can freely prioritize the paths. The egress adapter may select one ingress adapter and the HopID from the list of all open resources after following the prioritization logic, for example, for USB4 it may perform a round robin on the priority logic but may schedule only up to weight count packets per path. The egress adapter set values for e.p.Request, e.p.HopID, e.p.InputPort, e.p.OutputPort and passes this on to the routing matrix. The routing matrix copies these over to its internal buffer (this buffer may differ from the one maintained for the requests). On the next clock these values may be copied over to the destined ingress adapter, from which the egress adapter seeks the packets by setting i.p.Request, i.p.HopID, i.p.InputPort and i.p.OutputPort.

Figure 10:
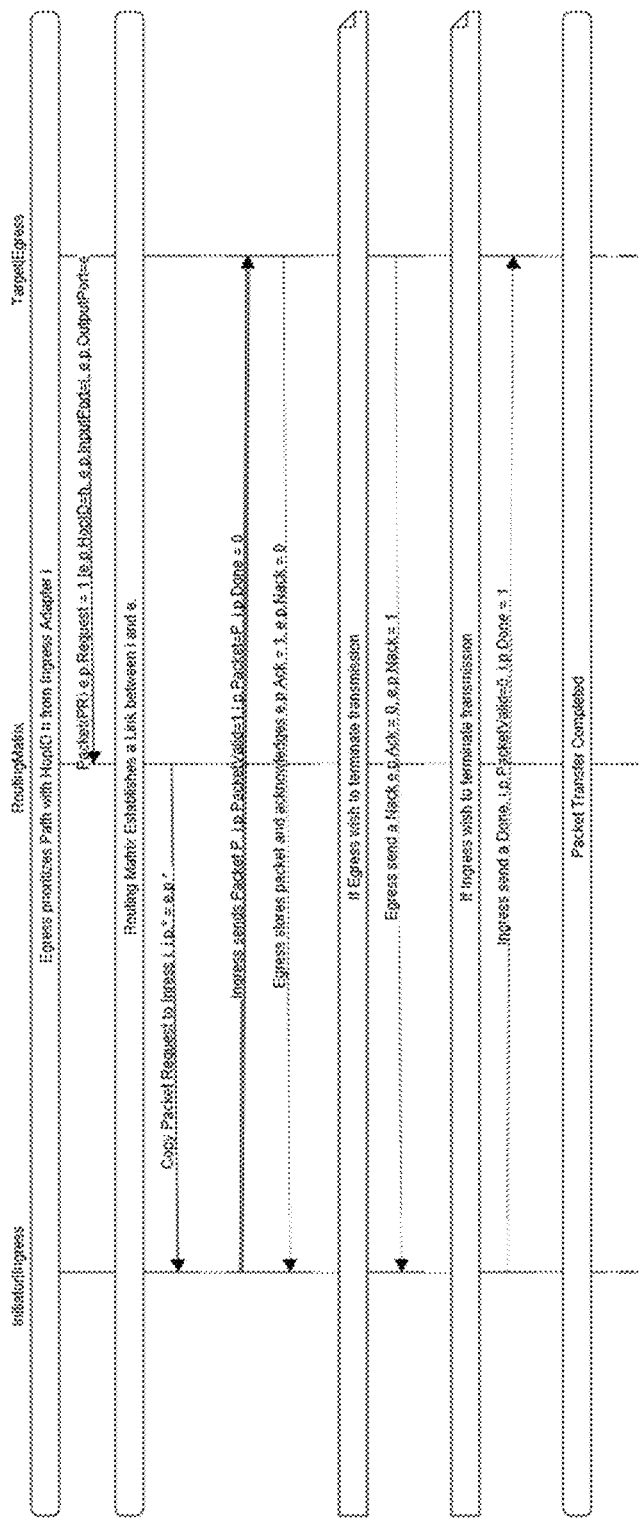
FIG. 10 is an example showing a packet transmission sequence chart according to an embodiment of the present disclosure.

In some embodiments, the protocol for TLP exchange may include a packet transfer [PktTransfer] phase as shown in FIG. 10. Here, the ingress port identifies the request coming in from the routing matrix and at the next clock edge it may start populating the i.p.Packet and i.p.PacketValid signals fetching these from its internal buffers. While the link is active, the routing matrix may maintain a connection between the egress and the ingress adapters and may transfer the packets from ingress to egress without any intermediate buffering. This implies that the signals may pass from ingress to egress without any delay, and vice versa. Every time a packet is transferred, the egress will assert e.p.Ack signal, which may be connected to the i.p.Ack signal, and e.p.Nack in the event it is unable to sink in anymore packets. The ingress may retain the values of the i.p.Packet and i.p.PacketValid until it sees either i.p.Ack or i.p.Nack signal. The transmission may be completed, when e.p.Nack is asserted. In the event the egress wants to stretch out the request, it may continue to hold e.p.Ack and e.p.Nack to low. In the event that the ingress receives a high priority request or it wish to break off the connection for any reason, or if there are no more pending packets available, it may assert the i.p.Done signal. Similarly, the transmission may be terminated, if e.p.Nack is asserted. While the transmission is in progress, the routing matrix may continue to maintain a one to one connection, with no delay, and it may continue to monitor the i.p.Done and e.p.Nack signals. When either of these is asserted, the link is broken. The link may also be broken off if the e.p.Request is de-asserted, however this is unusual. The ingress will not know if the packet which was in flight was completed or not, and it may reattempt the same again.

Figure 11:
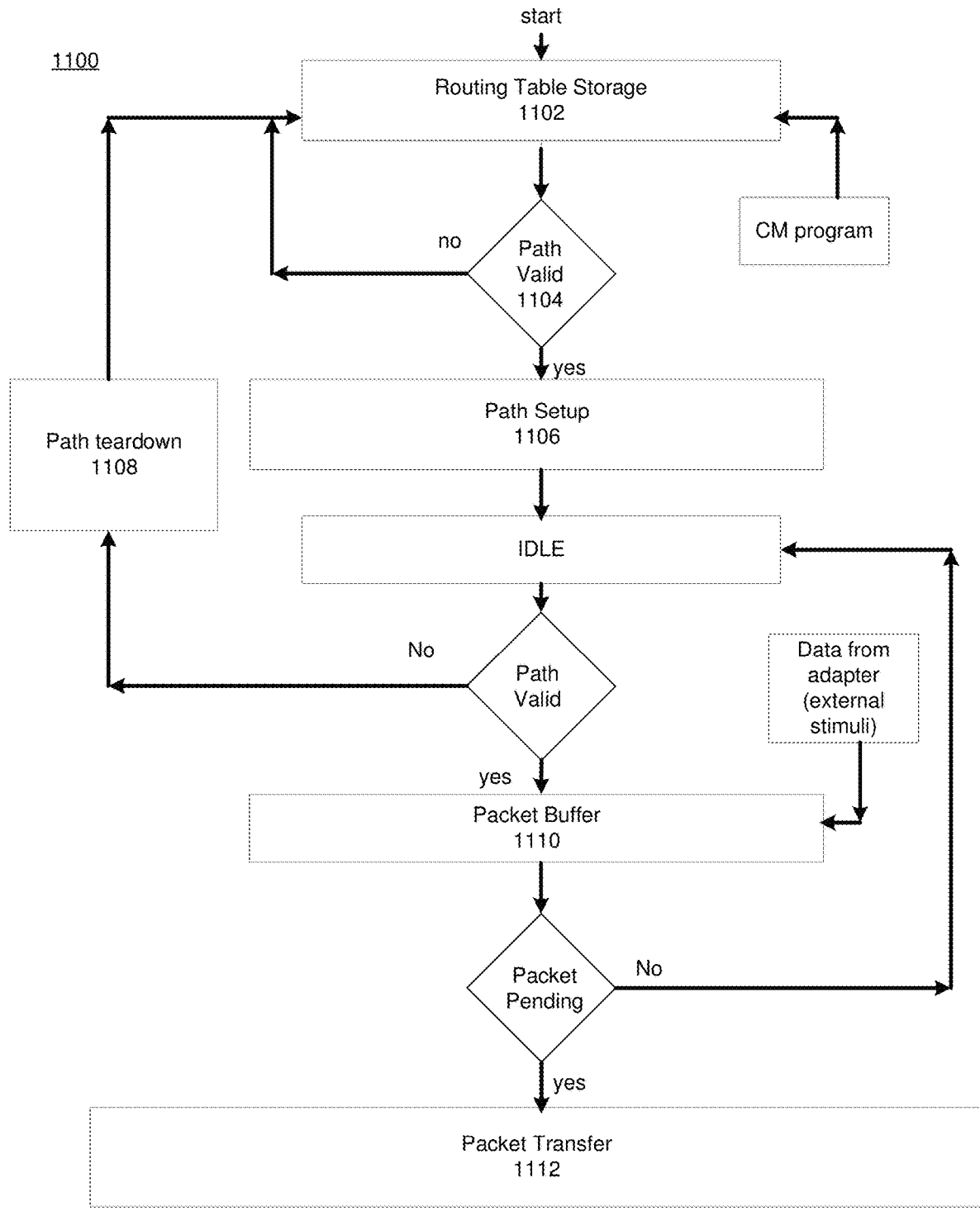
FIG. 11 is an exemplary flowchart of a routing process according to an embodiment of the present disclosure.

Referring now to FIG. 11, a flowchart 1100 showing exemplary operations consistent with embodiments of routing process 10 is provided. In some embodiments, some or all paths and path attributes/properties may be stored 1102 at a routing table. The process may determine 1104 whether or not a particular path is valid and, if so, the path setup process may initiate 1106. During path setup some or all of the paths between adapter pairs may be configured and setup across the routing matrix using a two-pair phase protocol. If the path is not valid a path teardown operation 1108 may be performed where a selected valid path may be tore down using a multi-phase protocol. If the path is deemed valid any incoming TLPs in the ingress port may be stored 1110 at an internal buffer. This internal buffer may receive data from an adapter or external stimuli. If any packets are pending, the process may perform packet transfer which includes a multi-phase packet transfer 1112 in which multiple packets may be transferred simultaneously between multiple adapter pairs.

Embodiments of the routing process described herein provide numerous advantages over existing approaches. Routing process 10 is a high availability approach as all ingress ports may maintain active connections with a single egress port at one time, for a total of N connections for N total adapters. The overall packet transmission may be broken into different phases. This implies that both the ingress and egress adapters are free to pursue more than one transfer request. This helps with the prioritization logic on the egress side, which can now receive multiple active requests and decide on the priority.

Embodiments of routing process 10 are highly scalable, and can scale as much as the total number of ports in the router. There is no single bottleneck, the processing is modular and the implementation logic is spread through multiple units, which allows this solution to easily scale for many ports. Embodiments included herein provide many options to extend functionality as the number of parameters may be varied, including on the actual packet side. If the packets can be fragmented, then even large packets can be supported over the active link with no latency.

Embodiments of routing process 10 are emulation friendly as there are no large multi-port memories in this solution, which makes it relatively easy to compile, place and route with great critical path (step count), and low gate area consumption. Since there are no software components which can stop emulator clocks, routing process 10 may be able to operate at the maximum frequency possible with no interruptions. All of the logic proposed operates at the same clock as the protocol, so there are no faster clocks introduced, and thus no slow down the design execution on the emulators.

Embodiments of routing process 10 provide a high throughput solution. There is an initial latency while the first few requests go through, however once the transmission starts there is zero latency, and the ingress and egress adapters may continue to batch and send multiple packets across the link without any clock delays. Also, since the request and packet transmission phases are pipelined, there is no further latency added. In this way, the routing matrix can keep up with the theoretical maximum bandwidth of the protocol.

Embodiments of routing process 10 provide a customizable solution, and since most of the logic in the ingress and egress adapters is available locally, it is very easy to customize, by adding more parameters or options in both the request and packet transmission phases. The individual ingress and egress behavior may be programmed and the routing matrix architecture does need to be altered in the event the users wish to add new kind of requests, as the routing matrix simply copies over the request from ingress to egress ports.

Embodiments of routing process 10 is faster and more de-centralized than existing approaches, allowing for the solution to scale very easily. There is no hardware to software translation requirement and the solution can work at very low abstractions. Also, since the proposed solution uses very small independent memories to store the data, it is much easier to partition the design, which works very well for emulation use-models. The protocol is transactional in nature and allows for both initiator and target to perform other operations if the path is busy, or the other entity is busy. The packet exchange protocol allows the target to determine the priority of the incoming paths and then request the packet from the initiator. As the initiator has already notified of the number of packets available for transmission, the packet exchange phase has very high availability. Embodiments included herein require minimal buffering in the targets, while there is no need for priority management in the initiators. This greatly simplifies the RTL design logic, and makes the whole implementation highly modular and simple to implement.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use in an emulation platform comprising:

enabling data transmission between plurality of protocol adapters configured for use with the emulation platform, each of the protocol adapters including one ingress port and one egress port, wherein the ingress port of each of the plurality of protocol adapters maintains an active connection with a single egress port at one time; and transmitting data between the plurality of protocol adapters using a single distributed routing matrix that provides a direct interface between each of the plurality of protocol adapters, wherein the distributed routing matrix includes a plurality of decentralized memories.

2. The computer-implemented method of claim 1, wherein the routing matrix is entirely implemented using a register-transfer-level implementation.

3. The computer-implemented method of claim 1, wherein the routing matrix utilizes a four phase packet exchange protocol with pipelining.

4. The computer-implemented method of claim 3, wherein the protocol allows for simultaneous parallel request and packet transmission.

5. The computer-implemented method of claim 1, wherein the routing matrix includes buffering for packet requests.

6. The computer-implemented method of claim 5, wherein the routing matrix includes direct and stable zero clock delay.

7. The computer-implemented method claim 1, wherein the routing matrix does not include a dedicated central processing unit.

8. The computer-implemented method of claim 3, wherein the protocol allows at least a first active connection to perform other operations if a first path is busy.

9. The computer-implemented method claim 3, wherein a target decides a priority of an incoming path and requests a packet from an initiator.

10. A non-transitory computer-readable storage medium having stored thereon instructions that when executed by a machine result in the following operations for use in an emulation platform, the operations comprising:

enabling data transmission between a plurality of protocol adapters configured for use with the emulation platform, each of the protocol adapters including one ingress port and one egress port, wherein the ingress port of each of the plurality of protocol adapters maintains an active connection with a single egress port at one time, wherein each ingress port is configured to receive one or more transport layer packets from one or more of the plurality of protocol adapters and to store the one or more transport layer packets in at least one local buffer; and transmitting data between the plurality of protocol adapters using a single distributed routing matrix that provides a direct interface between each of the plurality of protocol adapters, wherein the distributed routing matrix includes a routing table that stores one or more paths and path properties, wherein the distributed routing matrix includes a plurality of decentralized memories.

11. The non-transitory computer-readable storage medium of claim 10, wherein the routing matrix is entirely implemented using a register-transfer-level implementation.

12. The non-transitory computer-readable storage medium of claim 10, wherein the routing matrix utilizes a four phase packet exchange protocol with pipelining among a request and packet exchange phase.

13. The non-transitory computer-readable storage medium of claim 12, wherein the protocol allows for simultaneous parallel request and packet transmission.

14. The non-transitory computer-readable storage medium of claim 10, wherein the routing matrix includes buffering for packet requests.

15. The non-transitory computer-readable storage medium of claim 14, wherein the routing matrix includes direct and stable zero check delay.

16. The non-transitory computer-readable storage medium of claim 10, wherein the routing matrix does not include a dedicated central processing unit.

17. The non-transitory computer-readable storage medium of claim 12, wherein the protocol allows at least a first active connection to perform other operations if a first path is busy.

18. The non-transitory computer-readable storage medium of claim 12, wherein a target decides a priority of an incoming path and requests a packet from an initiator.

* * * * *